(12) United States Patent
Bloching et al.

(10) Patent No.: US 9,804,947 B2
(45) Date of Patent: Oct. 31, 2017

(54) METHOD AND SYSTEM FOR TIME-BASED DATA GENERATION

(71) Applicant: SAP SE, Walldorf (DE)

(72) Inventors: Uwe Bloching, Nussloch (DE); Stefan Rau, Dielheim (DE)

(73) Assignee: SAP SE, Walldorf (DE)

( * ) Notice: Subject to any disclaimer, the term of this patent is extended or adjusted under 35 U.S.C. 154(b) by 94 days.

(21) Appl. No.: 14/947,503

(22) Filed: Nov. 20, 2015

(65) Prior Publication Data
US 2017/0147470 A1    May 25, 2017

(51) Int. Cl.
| | |
|---|---|
| G06F 11/36 | (2006.01) |
| G06F 3/06 | (2006.01) |
| G06F 9/44 | (2006.01) |
| G06Q 10/06 | (2012.01) |

(52) U.S. Cl.
CPC ........ *G06F 11/3612* (2013.01); *G06F 3/0604* (2013.01); *G06F 3/0619* (2013.01); *G06F 3/0653* (2013.01); *G06F 3/0659* (2013.01); *G06F 3/0683* (2013.01); *G06F 11/3684* (2013.01); *G06F 8/35* (2013.01); *G06Q 10/06* (2013.01); *G06Q 10/06316* (2013.01)

(58) Field of Classification Search
CPC ...... G06F 8/35; G06F 11/3612; G06F 3/0604; G06F 3/0619; G06F 3/0653; G06F 3/0659; G06F 3/0683; G06Q 10/06; G06Q 10/06316; G06Q 10/0631; G06Q 10/0633; G05B 19/4183; G05B 19/41835–19/41885
See application file for complete search history.

(56) References Cited

U.S. PATENT DOCUMENTS

| | | | | |
|---|---|---|---|---|
| 5,761,200 A | * | 6/1998 | Hsieh ................ | G06F 13/4243 370/364 |
| 6,374,369 B1 | * | 4/2002 | O'Donnell ......... | G06F 11/3466 714/38.11 |
| 7,379,999 B1 | * | 5/2008 | Zhou ................... | G06F 11/3476 709/224 |
| 7,917,524 B2 | * | 3/2011 | Brunswig ............ | G06Q 10/06 707/756 |

(Continued)

OTHER PUBLICATIONS

Artho, C., et al., Experiments with Test Case Generation and Runtime Analysis, International Workshop on Abstract State Machines, ASM 2003, pp. 87-108, [retrieved on Sep. 15, 2017], Retrieved from the Internet: <URL:http://www.diva-portal.org/smash/get/diva2:1060374/FULLTEXT01.pdf>.*

(Continued)

*Primary Examiner* — Geoffrey St Leger
(74) *Attorney, Agent, or Firm* — Buckley, Maschoff & Talwalkar LLC

(57) ABSTRACT

A method, system, and computer-readable medium to generate time based data, including defining a time based data generation scenario, the time based data generation scenario including at least one event, the event representing an action at a specific time; a plurality of time segments, each time segment defining a particular temporal phase of the scenario and at least one time segment being embedded with the at least one event; and a time envelope to embed time segments; and generating time based data by executing the time based data generation scenario.

16 Claims, 8 Drawing Sheets

500

| Outer Time Envelope "Work Shift", Length = 8h, No Repetition, Input = Start Time ||||
|---|---|---|---|
| | 517 Time Envelope "Production", Repetitions = Infinite, No Time Range Calculator || |
| 520 Time Segment "Machine On", Length = 7 Min., No Events | 510 Time Segment "Machine Preparation", Length = 9 Min., No Events | 515 Time Segment "Machine Operation", Length = 27 Min., Events = A1, M1, M2 | 525 Time Segment "Machine Off", Length = 3 Min., No Events |

(56) References Cited

U.S. PATENT DOCUMENTS

| | | | | |
|---|---|---|---|---|
| 8,498,568 B2* | 7/2013 | Patsiokas | ............... | H04H 40/90 455/3.06 |
| 2004/0107386 A1* | 6/2004 | Burdick | ............. | G06F 11/3668 714/38.1 |
| 2005/0223295 A1* | 10/2005 | Hermes | ............... | G06F 11/3684 714/38.1 |
| 2008/0204446 A1* | 8/2008 | Northway | ......... | G06F 17/30056 345/418 |
| 2010/0175052 A1* | 7/2010 | Prasad | ................ | G06F 11/3612 717/128 |
| 2011/0021136 A1* | 1/2011 | Patsiokas | ............... | H04H 40/90 455/3.06 |
| 2014/0379112 A1* | 12/2014 | Kocis | ..................... | G05B 17/02 700/97 |
| 2015/0278075 A1* | 10/2015 | Loganathan | ........ | G06F 11/3684 714/38.1 |
| 2015/0341212 A1* | 11/2015 | Hsiao | .................. | H04L 41/0813 715/735 |
| 2016/0004622 A1* | 1/2016 | Kaulgud | ............. | G06F 11/3612 717/132 |
| 2016/0211664 A1* | 7/2016 | Subbotin | ................... | H02J 3/32 |
| 2016/0350204 A1* | 12/2016 | Conlon | ............... | G06F 11/3612 |

OTHER PUBLICATIONS

Wang, C., et al., Automatic generation of system test cases from use case specifications, Proceedings of the 2015 International Symposium on Software Testing and Analysis, Jul. 13-17, 2015, pp. 385-396, [retrieved on Sep. 15, 2017], Retrieved from the Internet: <URL:http://dl.acm.org/>.*

Lau, H. C., et al., Pickup and delivery with time windows: algorithms and test case generation, Proceedings 13th IEEE International Conference on Tools with Artificial Intelligence, 2001, pp. 333-340, [retrieved on Sep. 15, 2017], Retrieved from the Internet: <URL:http://ieeexplore.ieee.org/>.*

* cited by examiner

200

300

METHOD AND SYSTEM FOR TIME-BASED DATA GENERATION

BACKGROUND

In the field of software applications, including but not limited to software related to statistical analysis, there is a need and desire to demonstrate a functionality of the software application for one or more purposes. The functionality of the software application may need to be demonstrated to verify that the software functions as it is designed to function. The demonstration may be conducted for the benefit of a software designer, developer, or administrator, or for a potential customer interested in procuring the software application. In an effort to thoroughly test the software application, a set or sets of data may be provided to software application for consumption thereby.

In some situations, actual historical data relating to a business or other entity may be obtained that corresponds to the type and scope of data that a software application can consume while being verified. However, such data is often closely related to a business or other entity, confidential and/or proprietary, not easily modified (if even permissible), and possibly not up-to-date.

Accordingly, in some contexts, there may exist a desire to generate time based data conforming to well-defined data patterns that reflect real-world behavior(s)

DETAILED DESCRIPTION

The following description is provided to enable any person in the art to make and use the described embodiments. Various modifications, however, will remain readily apparent to those skilled in the art.

Figure 1:
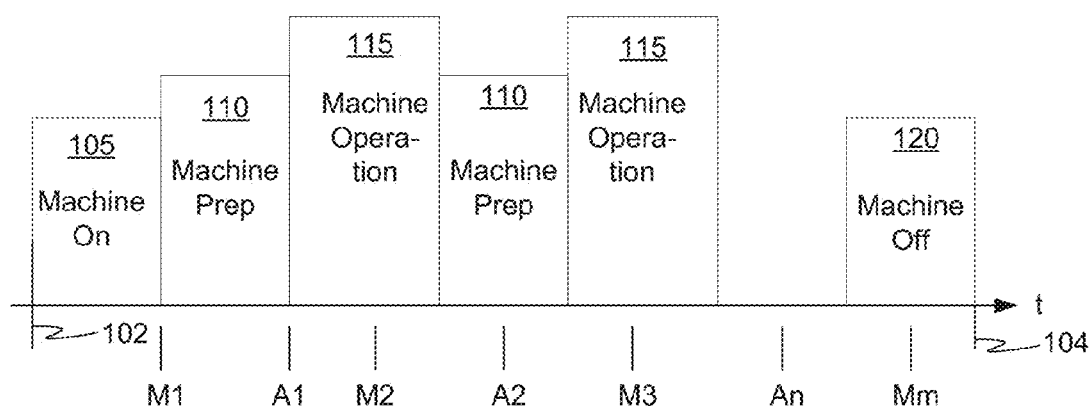
FIG. 1 is an illustrative depiction of an scenario including different phases of time, in accordance with some embodiments herein.

FIG. 1 is an illustrative depiction of a scenario 100 for which data may be generated for, according to some of the aspects of the present disclosure. There are many different software applications that can process time based data. The time-based data may include, for example, alarm data regarding machines (e.g., a machine exceeded a maximum operating temperature) and measurement data provided by sensors of machines (e.g., the temperature of a motor over time). In order to test, verify, and demonstrate at least some functionality of some software applications, data adhering to well-defined data patterns that reflects the behavior of a real-world entity (e.g., a machine) may be desired. Some embodiments and aspects of the present disclosure relate to methods and systems to selectively generate time-based data. That is, data corresponding to well-defined data patterns having characteristics that depend on time may be generated by some aspects of the present disclosure. As used herein, well-defined data refers data representative of actual real-world data that can be consumed by an application or machine. The software application or machine may have certain specific expectations for the data it consumes. As such, the data (actual, historical data or artificially generated) consumed by the application or machine needs to conform to certain, known constraints. Accordingly, the data that is to be generated in some embodiments herein is referred to as well-defined time-based data since it is defined to include the features necessary for consumption by a particular application or machine.

In some aspects, the amount of data that can be consumed by an application can include millions or even billions of records. Accordingly, some processes disclosed herein may be capable of artificially generating massive amounts of time-based data. The data is artificially generated as opposed to being derived from actual historical data. In some aspects, the data generated in accordance with some embodiments herein can be updated and otherwise modified since it is artificially generated data.

In an effort to clearly explain various concepts herein, scenario 100 of FIG. 1 depicting the different phases of a work shift of a machine (e.g., a drilling machine) for which alert and measurement data is to be generated may be referenced at various points in the discussion below.

Scenario 100 includes a work shift for the machine having a start time 102 and an end time 104. Although a work shift begins at 102, it takes a while for the machine to become operational. For example, before the machine can start to work it may have to be prepared to perform certain tasks (e.g., the machine may have to be configured with appropriate drills before it can start drilling). Accordingly, the machine may be turned on at 105 and remain in a preparation phase during the range of time indicated at 110. After the machine is prepared for operation at 110, the machine enters an operational phase 115 for a period of time until it is done with its work. Then, the machine is prepared for the next operation as indicated by the second instance of the machine preparation 110. In the present example, the machine may repeatedly enter the preparation phase 110 and the operation phase 115 until the end of the shift at 104. At the end of the work shift, the machine is turned off during a machine turn off phase 120. During the different temporal phases of machine operation, alert data (i.e., alert data x=Ax) and measurement data (i.e., measurement data x=Mx) may be collected in a real-world environment. For simulation purposes, the present disclosure provides mechanism(s) to create the time-based data (e.g., alert data and measurement data) artificially according to given data-patterns that are required for testing, verification and demo purposes.

In some aspects, different types of data may be generated by the method and systems herein other than alert data and measurement data. For example, time based location data for a machine may be generated (e.g., time-based global positioning system, GPS, data) in some instances.

In an effort to clearly describe the present disclosure, a number of concepts and terms will now be introduced and described in detail.

As referred to herein, "time based objects" are the building blocks used to describe a time based data generation scenario. According to the requirements of a particular scenario, time based objects can be designed and assembled together to represent the scenario. A scenario may be defined by one or more independent and/or co-dependent time based objects.

As referred to herein, an "event" represents an action at a certain point in time. For example, the advent of an alert or measurement data of a machine that is provided by a sensor is an event. In general, an event may refer to all types of data. In some embodiments herein, an event has the following characteristics:

Timestamp—describes the point in time at which an event has occurred
Identifier—name for the event (e.g., 'Alarm Motor')
Start point in time of data generation
Occurrence—how often does the event occur (e.g., each hour)
Duration—how long does the event last (e.g., 5 minutes)
Maximum time range—maximum time for event (e.g., start 8 AM, stop 8 PM)
event specific parameters—e.g., error id, measurement value
creates event data the event is responsible for (e.g., sensor data)

Figure 2:
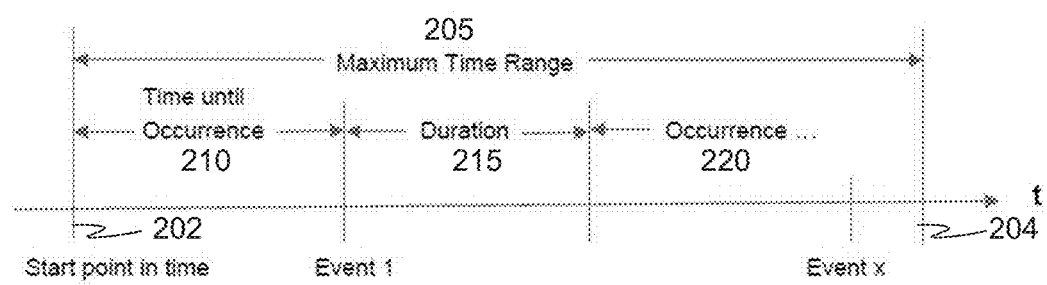
FIG. 2 is an illustrative depiction of time characteristics for an event, in accordance with some embodiments herein.

FIG. 2 is an illustrative depiction of the time characteristics 200 of an event introduced above. As shown, the start point in time 202 determines the earliest possible point in time an event can occur. In some embodiments, the occurrence and duration of an event may be calculated by a Value Calculator process or device. For example, an Occurrence Value Calculator may calculate the time until an event happens (e.g., occurrence 210) and a Duration Value Calculator may calculate for how long an event is valid (i.e., duration 215). In some aspects, a value calculator may calculate values that are a constant value and/or values that correspond to a normal distribution (i.e., a specific relationship). The maximum time range 205 describes the time period within which an event can occur. As shown, the occurrence calculation (e.g., 220) is triggered at the end of an event duration period 215 and stops if a point in time is calculated that is outside of the maximum time range (i.e., greater than the point in time 204).

Figure 3:
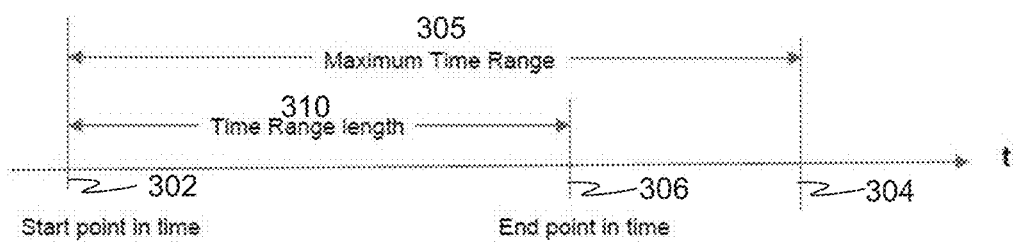
FIG. 3 is an illustrative depiction of time characteristics for a time segment, in accordance with some embodiments herein.

As referred to herein, a "Time Segment" is a time entity that defines a specific range of time. A Time Segment spans a calculated period of time and it embeds events that can occur within the time range of a Time Segment. The events embedded in a Time Segment are processed in the chronological order in which they were registered with a particular Time Segment. In some aspects, Time Segments may have no events assigned to them and can be used to, for example, fill a given time range. A Time Segment, in some embodiments herein, has the following characteristics:

Identifier—name (e.g., 'Machine On')
Start point in time
Time range length
Embedded events (optional)
Maximum time range
Plausibility check logic
End point in time
Triggers the data generation for the events it embeds FIG. 3 is an illustrative depiction of the time characteristics 300 for a Time Segment, as introduced above. The time range length 310 may be calculated by using a value calculator process or machine. In some aspects, a value calculator may calculate values that are a constant value and/or values that correspond to a normal distribution (i.e., a certain relationship). The maximum time range 305 describes the time period for which a Time Segment is responsible and starts at a start point in time 302 and ends at 304. In some aspects, a Time Segment may not necessarily embed events. In some such cases, the Time Segment may be used to fill a certain time range, e.g., the 'Machine On' 105 phase in FIG. 1 above having the occurrence of no events therein.

In some embodiments, depending on the setup and the runtime characteristics of a scenario, the maximum time range 305 may be smaller than the calculated time range length 310 of a segment. An example of this type of situation exits if a phase 'Machine Operation' 115 in FIG. 1 reaches the end of a work shift. In this case, there might be less time available than calculated by the time range length calculator. In some embodiments, it is the responsibility of a Time Segment to communicate the maximum time range length to its potentially embedded events.

In some instances, plausibility check logic for the execution of a Time Segment may be executed to determine whether a Time Segment is to be processed in the case that the Maximum Time Range 305 is smaller than the calculated Time Range Length 310. In some embodiments, this plausibility logic may determine whether such a situation represents an error in the data being generated or whether the execution is to be stopped.

In some embodiments, the end point in time 306 of a Time Segment may be calculated according to the following formula:

$$\text{End point in time} = \text{MIN}((\text{Start Point} + \text{Time Range Length}), (\text{Start Point} + \text{Maximum Time Range}))$$

Figures 4, 5:
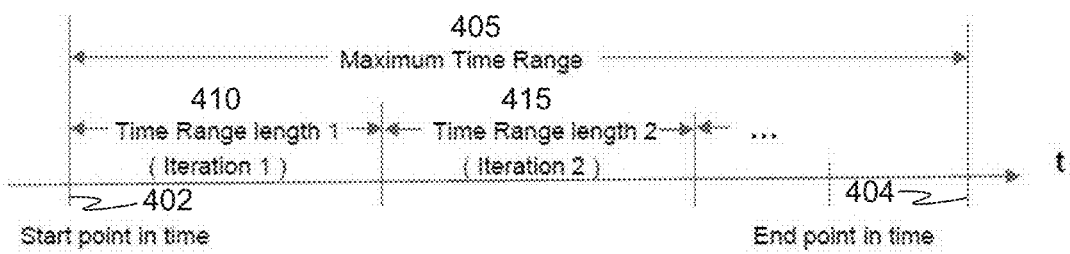
FIG. 4 is an illustrative depiction of time characteristics for a time envelope, in accordance with some embodiments herein.
FIG. 5 is an illustrative depiction of a scenario expressed in different time based data objects, in accordance with some embodiments herein.

In accordance with various aspects herein, a Time Envelope is a time entity that encompasses and embeds one or more Time Segments. FIG. 4 includes a graphical representation 400 of some aspects of a Time Envelope. A Time Envelope can optionally have a time range length 410, 415 and, optionally, be repetitive (e.g., 410=415). Similar to other time based objects, the Time Envelope has a Maximum Time Range 404 extending from the start point in time 402 to the end point in time 404. Time Envelopes may, in some embodiments, embed Time Segments and other Time Envelopes. The Time Segments and other Time Envelopes embedded in a Time Envelope are processed in the chronological order in which they were registered with a Time Envelope.

In accordance with some embodiments herein, a Time Envelope has the following characteristics:

Identifier—e.g., 'Work Shift'
Start Point in Time
Time Range length (optional)
Repetitions (optional, default=0)
Embedded Time Segments and Time Envelopes
Maximum time range End Point in time calculation behavior
Plausibility check logic
End Point in Time
Triggers the data generation for the time based objects it embeds In some embodiments, a Time Envelope 400 might calculate its time range length if a time range length calculator has been assigned to it. In some regards, a Time Envelope may optionally repeat the processing of its embedded Time Segments (e.g., a first Time Segment in time range 410 and second Time Segment 415) and Time Envelopes for either a given number of times or indefinitely. As used herein, "indefinitely" means that processing continues until the end of the maximum time range of the Time Envelope has been reached.

FIG. 4 depicts the time characteristics of a Time Envelope with and without time range length calculation and with repetitions. In some embodiments, depending on the setup and the runtime characteristics of a scenario, the maximum time range 405 of a Time Envelope may be smaller than a calculated time range length (e.g., 410) of a Time Envelope. For example, this may be the case if the phase 'Machine Operation' 115 in FIG. 1 reaches the end of a work shift. In this instance, there might be less time available than calculated by the time range length calculator for the Time Envelope.

In some embodiments, it may be the responsibility of a Time Envelope to communicate the maximum time range to its potentially embedded Time Segments and Time Envelopes. A plausibility check logic for the execution of a Time Envelope may determine whether a Time Envelope is to be processed in the instances the Maximum Time Range 405 is smaller than the calculated Time Range Length (e.g., 410, 415). It is up to this logic to determine whether such a situation represents an error in the data or whether the execution of the Time Envelope is to be stopped (e.g., in case of a Time Envelope with infinite repetitions). It is noted that in case of repetitions, the time range length may be calculated separately for each iteration. The different time range lengths may be different in size depending on a Value Calculator used.

In some embodiments, the end point in time 404 of a Time Envelope as illustrated in FIG. 4 can be calculated in one of the following manners:

End Point in Time=Start Point+MIN(Time Range length,Maximum Time Range)

or

End Point in Time=End point of last embedded time based object

In some regards, the manner in which the end point in time is calculated may depend on a data generation scenario. For example, if we want to make sure that a Time Envelope spans a well-defined amount of time (e.g., 8 hours for a work shift), then we can assign the following characteristics to it:

Time Range Length=constant value=8 hr
Repetitions=0
End Point in Time=Start Point+MIN(Time Range length, Maximum Time Range)

If however, we want to make sure that the End Point in time of a Time Envelope=end point in time of the last embedded element, then we can assign the following characteristics to it:

Time Range length calculator=arbitrary (yes/no)
Repetitions=arbitrary (0, n, infinite)
End Point in Time=End point of last embedded time based object Another time based data object herein is an Outer Time Envelope which is the top-level Time Envelope of a time based data generation scenario that includes all of the time based objects needed to define a scenario. In some aspects, an Outer Time Envelope includes scenario specific parameters that may be defined by a user or other entity. All other time based entities below an Outer Time Envelope are generic in nature. Since the Outer Time Envelope is the top-level aspect for a scenario, there can be only one per entity node. It is noted that an Outer Time Envelope has the same characteristics as a regular Time Envelope since it may be viewed as a special version or extension of a Time Envelope. However, an Outer Time Envelope may additionally have the following responsibilities:

Provides access to a DB Table Buffer into which event data is to be generated. All involved time based entities (e.g., Events, Time Segments and Time Envelopes) receive access to the buffer via the Outer Time Envelope. The DB Table Buffer is forwarded to an Outer Time Envelope by a so called Time Based Attribute Rule which represents the link to the pattern-driven Data Generator engine (will be further discussed below).

Receives data generation scenario specific parameters from a consumer at a data generation scenario design time or from the node property rule.

Calculates the start point in time for the time based data generation depending on the parameters received.

Calculates the time range length of the overall scenario=Maximum Time Range Length.

Triggers the data generation for the time based objects it embeds.

FIG. 5 is an illustrative depiction of scenario 500, corresponding to the scenario 100 in FIG. 1, wherein the time based object types introduced above are used to describe the example scenario. The Outer Time Envelope 'Work Shift' at 505 is the all-encompassing bracket for the involved time based objects in the present example scenario. The Outer Time Envelope has a well-defined length of 8 hours. The 'Machine On' Time Segment is shown at 520 and lasts 7 minutes, with no events. As an input parameter, it takes the time to start the data generation. The Time Segments 'Machine Preparation' at 510 and 'Machine Operation' 515 are to be repeated for an unknown number of times (e.g., until the end of the work shift is reached and the machine has to be turned off at 525), the Time Segments are embedded in the Time Envelope 'Production' 517. In the present example, Time Envelope 'Production' 517 does not have an explicit time range length and is to be repeated for an unknown number of times. Therefore, we set the number of repetitions equal to infinite.

The scenario shown and labeled as depicted in FIG. 5 may be referenced throughout the remainder of the present disclosure to describe and explain different aspects of time based data generation.

A time based attribute rule may be provided, in accordance with some embodiments herein. This attribute rule can be provided generically, meaning that it can be used for all different kinds of time based data generation scenarios. During a design time, attributes of an entity node's for which a time based attribute rule is responsible are specified. The time based attribute rules are the entity node attributes into which the time based data is to be generated by the different events provided for the entity node. The time based attribute rule is a mechanism to specify or define an attributes of data that are not itself time based, per se. The following may be performed to enable time based data generation via the time based attribute rule:

1. Instantiate a Time Based Attribute rule for the entity node for which the data is to be generated.
2. Instantiate an Outer Time Envelope and assemble the time based objects according to the needs of a given data generation scenario.
3. Pass the Outer Time Envelope to the time based attribute rule as a parameter. The time based attribute rule passes the DB Table Buffer to the Outer Time Envelope.

4. Start the data generation for the data generation scenario by triggering the data generation for the Outer Time Envelope.

In accordance with some embodiments, a time based object herein may be re-entrant. That is, the data generation of the time based object and its embedded objects can be interrupted and later resumed at any point in time. One reason for having time based objects that have this behavior is to facilitate the processing of database buffers where the buffers are not sufficiently large enough to store all of the time based data that may be generated. For example, for some data generation use-cases, billions of records may be generated using time based data generation aspects disclosed herein. As such, all of those records cannot be stored in a memory (e.g., RAM).

As an example, data records may be generated during a data generation process. After generating, for example, 10,000 records and storing them in memory, the data generation process may be interrupted, the data in the buffers can be persisted in a storage facility, and the data generation process may be resumed until a next 10 k records are generated and the process repeats.

Figure 6:
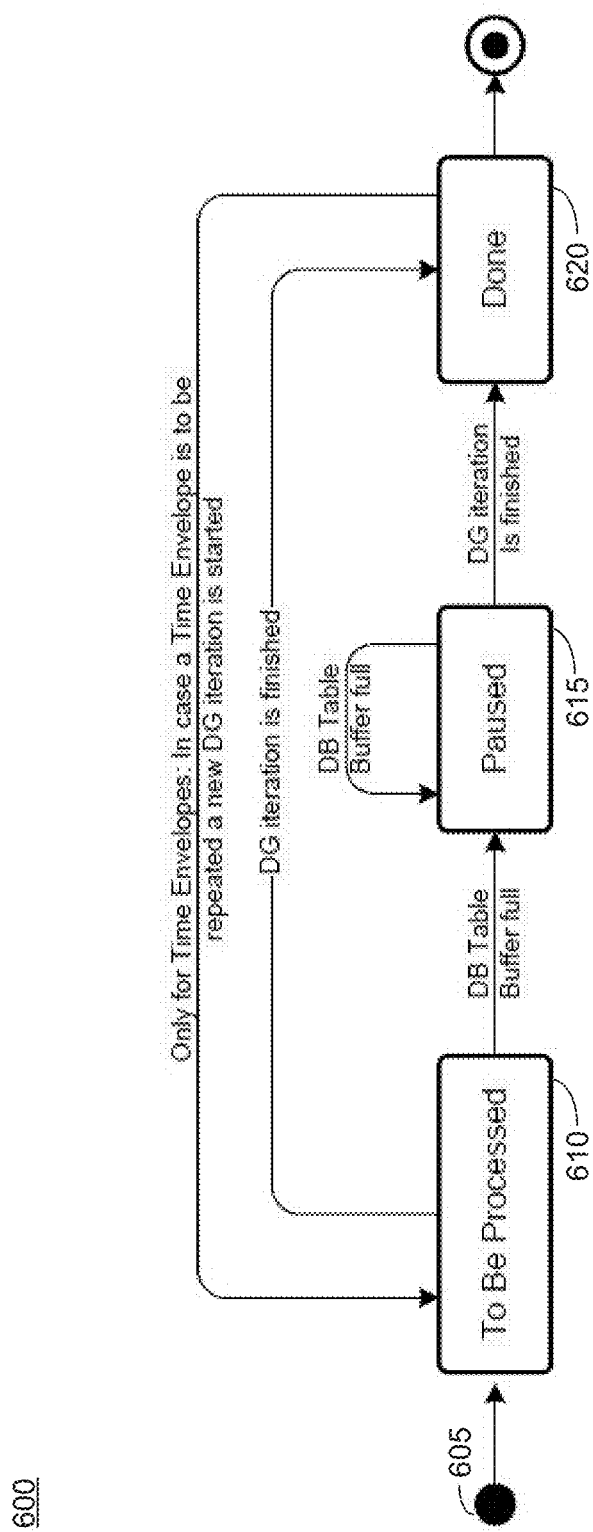
FIG. 6 is an illustrative depiction of different states for time-based data objects, in accordance with some embodiments.

FIG. 6 is an illustrative depiction of various different states for time based objects herein and the transitions therebetween for a data generation process 600. The data generation of time-based data starts at 605. Initially, before the data is generated, the time based objects has a state of "To_Be_Processed" as seen at 610. Thereafter, the data may be generated. If an event detects that a DB Table Buffer is full, it then sets its state to 'Paused' 615 and stops the data generation process. The 'Paused' state is propagated to its parent object(s) up to the (top-level) Outer Time Envelope. When in the 'Paused' state, the data is persisted before data generation can resume. The state of the attribute rule that encapsulates the Outer Time Envelope is set to 'Done' 620 and after all attribute rules of the entity node have been processed, the DB Table Buffer is persisted. After the data is persisted, data generation is triggered again by the DG Task and the time based objects in the 'Paused' state continue their work.

Figure 7:
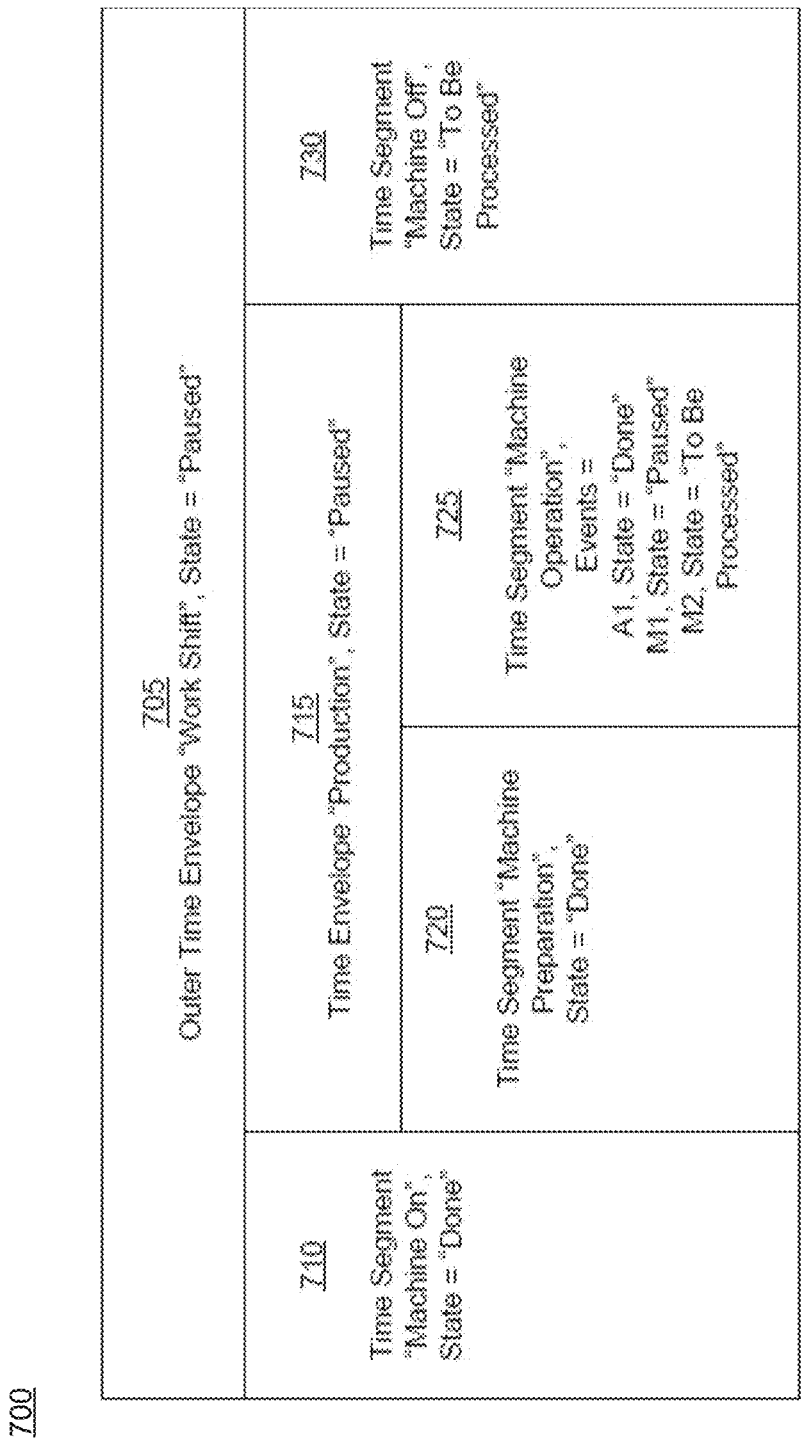
FIG. 7 is an illustrative depiction of a scenario expressed in different time based data objects including the states thereof, in accordance with some embodiments.

FIG. 7 is an illustrative depiction of the scenario 700 introduced in FIG. 1, where the state of the different phases of a time based data generation process are shown. Scenario 700 includes an Outer Time Envelope 705 that includes a number of Time Based Objects 710, 715, 720, 725, and 730. Time Envelope 715 comprises Time Segments 720 and 725. As this example shows, the second event of Time Segment 'Machine Operation' 725 detects that the DB Table Buffer is full and its state is 'Paused'. In response to the 'Paused' state of Time Segment 725, the states of the other different time based objects of scenario 700 will be changed as shown. In particular, the Time Segments 710, 720, and the first event A1 of Time Segment 725 had already been completed prior to detection of the full buffer by event M1. Accordingly, the state for the Time Segments 710, 720, and 725 event A1 is 'Done'. Also, event M1 of the Time Segment 'Machine Operation' is 'Paused" upon detection of the full buffer. In response thereto, 'Paused' state is passed up to the Outer Time Envelope 705 and Time Envelope 715. The state for the not yet processed event M2 of Time Segment, 'Machine Operation' and the Time Segment, 'Machine Off' is set at "To Be Processed".

After the DB Table Buffer has been persisted after the freezing or pausing of all data generation, data generation will be triggered again for the Outer Time Envelope 705. Due to the "re-entrant" behavior of the time based objects herein, data generation can continue for Time Envelope 'Production' 715, which in turn triggers Time Segment 'Machine Operation' 725. Continuing, event M1 is asked to continue its data generation. Data generation for event M2 will be subsequently generated.

In some embodiments, a Time Envelope that is designed to be processed repeatedly may operate to reset the state of itself and the states of its sub-ordinate time based objects to 'To Be Processed' at the end of each repetition as a mechanism to prepare them for the next data generation iteration.

In some embodiments herein, event data (though not necessarily exclusively) may be written into a so called DB Table Buffer. The advent and therefore also the amount of time based event data may be difficult, if not impossible, to calculate in advance because such data often depends on random functions, e.g. the advent of alert data (i.e., time stamps) may follow the law of exponential distribution. Accordingly, an accurate calculation of the required DB Table Buffer size cannot easily be accomplished in advance.

Figure 8:
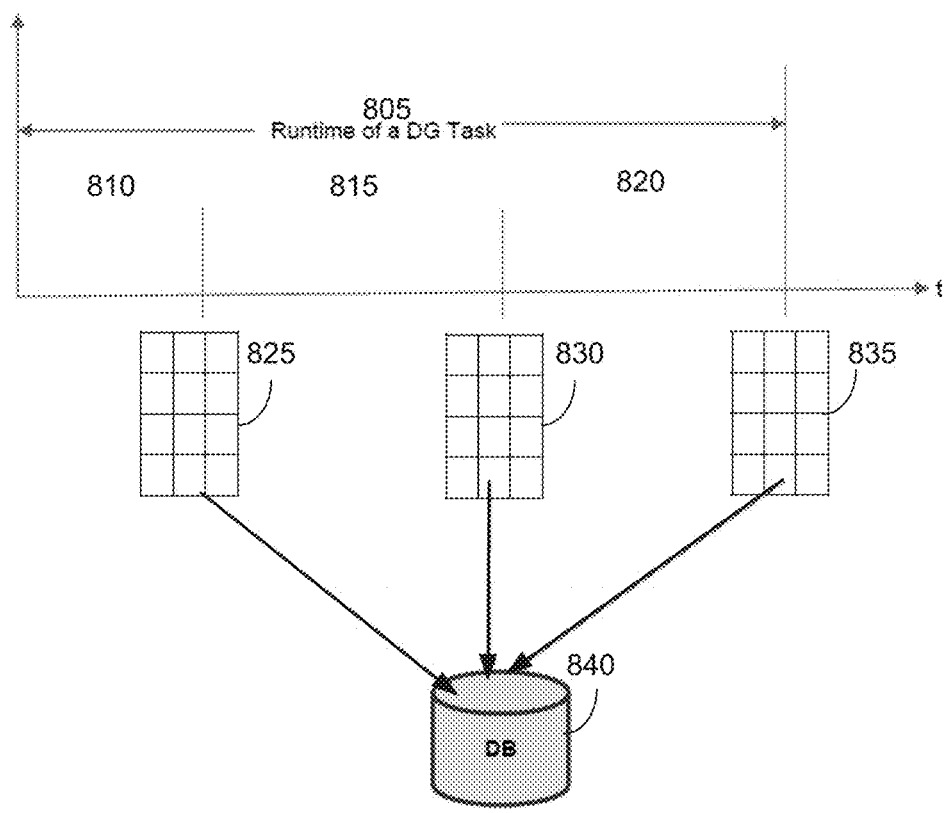
FIG. 8 is an illustrative depiction of a database table buffer mechanism, in accordance with some embodiments.

In contrast to non-time based data generation, it is not possible to provide a single DB Table Buffer that can store all the data created by a DG Task. To prevent DB Table Buffer overflow in some embodiments, the insertion of time-based event data into the buffer can be handled as follows:

FIG. 8 is an illustrative depiction of a process 800 for processing time based data generation using DB Table Buffers, in some embodiments. In some aspects, a DB Table Buffer of arbitrary size (e.g., 10,000 rows) may be provided for a time based data generation process. Event data is placed in a buffer 825 until it has been completely filled or until a data generation (DG) iteration 805 is completed. During a runtime of a data generation task 805 when a buffer 825 is determined to be full, the data generation will be interrupted and the content of the buffer 825 is persisted into a database 840. After the data is persisted in the database 840, a new DB Table Buffer 830 is provided and data generation can continue. These operations of creating data (815, 820), interrupting the data generation when a buffer (830, 835) is full or until the DG iteration 805 is completed, and persisting the data from the buffer to a database 840 may be repeated as often as necessary to store the full extent of the event data generated by a DG Task 805.

The state of the affected time based objects is set to 'Paused' if a DB Table Buffer is full. However, the DB Table Buffer cannot be persisted immediately if it is full because there may be other non-time based attribute rules involved in the data generation scenario that depend on the time-based data. In this case, these other non-time based attribute rules have to first be processed. After all attribute rules of an entity have been processed, then the DB Table Buffer can be persisted and data generation will be started again for the entity nodes. The time based data generation is continued from the point in time where it was interrupted.

In some embodiments, at least some time based objects herein may have design time parameters, e.g. an Outer Time Envelope. The time based objects might take as an input parameter the start point in time at which data generation is to be started. Events may take as input parameters values that describe the characteristics of an alert, e.g. the Alert Id. That is, time based objects herein may, in some embodiments, be modeled, defined, or otherwise specified as being based on some relationship or other non-fixed values.

Figure 9:
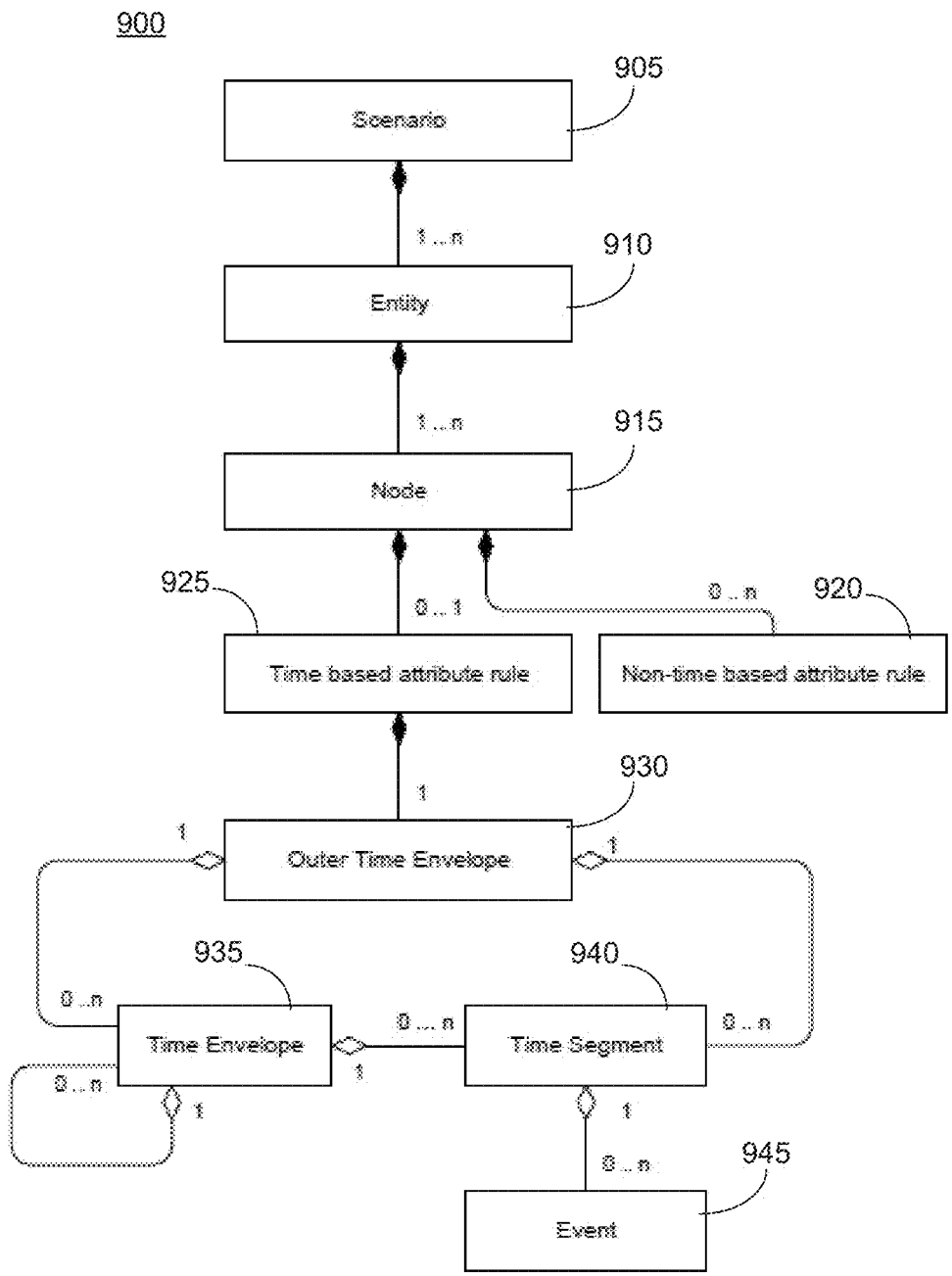
FIG. 9 is an illustrative logical organization of pattern-driven data generator artifacts for time-based data generation, in accordance with some embodiments.

FIG. 9 is an illustrative logical organization 900 of pattern-driven data generator artifacts for time-based data generation, in accordance with some embodiments herein. The logical organization 900 of FIG. 9 includes generic data generation objects including a scenario 905, an entity 910, and node 915. Scenario 905 is the particular use-case or context for which data is being generated (e.g., a verification and demonstration of a software application). The scenario may be represented by entities 910 that may include Business Objects (BOs) that corresponds to real-world processes, documents, etc. BOs 910 may be data structures defined by metadata specifying nodes 915 in terms of various attributes and methods. In general, nodes 915 may comprise non-time based attribute rules 920 and time based attribute rules 925. The time based attribute rules 925 are a focus of the present disclosure and act as links to the generic pattern-driven data generator objects to the time-based objects of a Outer Time Envelope 930, Time Envelope(s) 935, Time Segment(s) 940, and Event(s) 945, where each of time based objects conform to the description thereof above.

Figure 10:
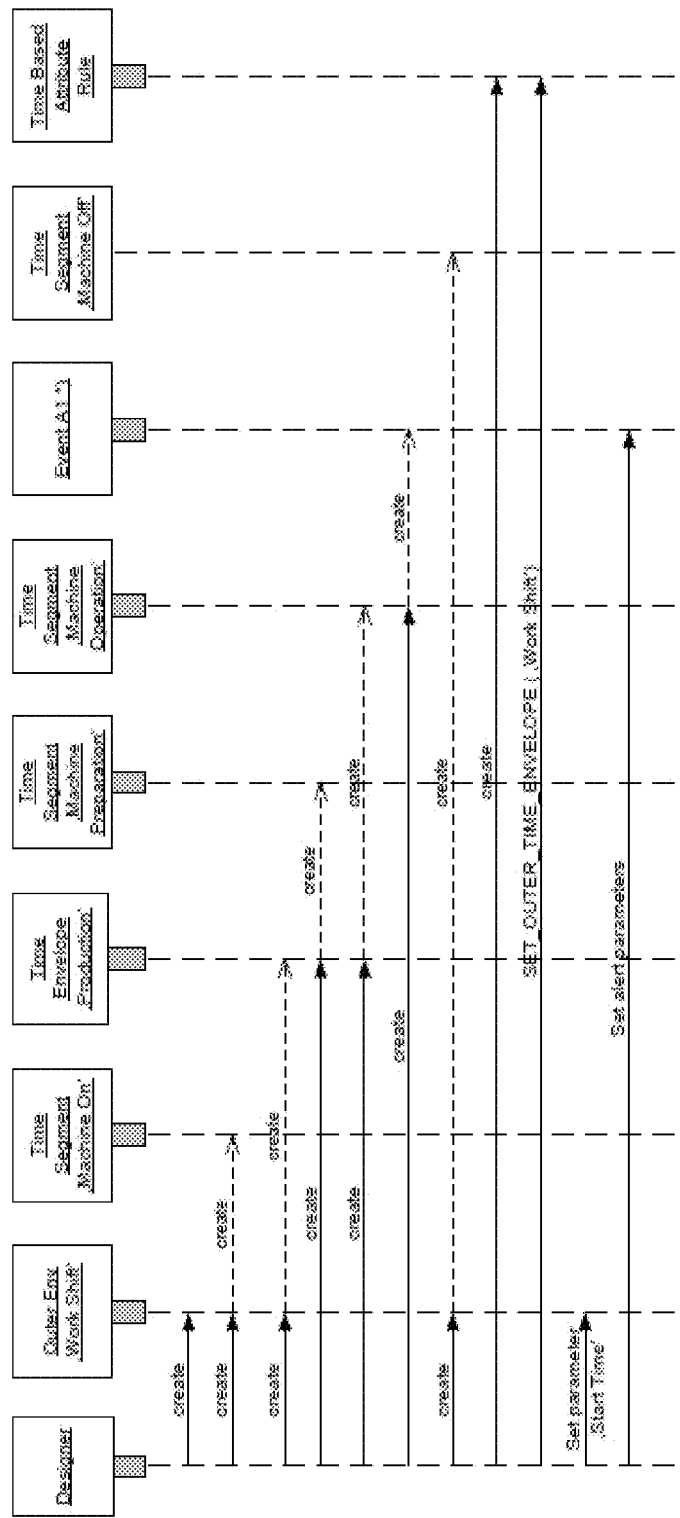
FIG. 10 is an illustrative depiction of a sequence diagram, accordance with some embodiments.

In some embodiments, a design process for a time-based data generation scenario may include assembling time-based objects according to the requirements of a scenario, as defined by the Outer Time Envelope, Time Envelope(s), Time Segment(s) and Event(s) thereof. If required design time parameters have to be passed to them. The sequence diagram shown in FIG. 10 depicts the steps required to design the example scenario shown above.

After the design process data generation can be triggered at the Time Based Attribute Rule which in turn triggers data generation for the Outer Time Envelope.

Aspects of the processes, systems, and services discussed hereinabove may be implemented through any tangible implementation of one or more of software, firmware, hardware, and combinations thereof.

Although embodiments have been described with respect to certain contexts, some embodiments may be associated with other types of devices, systems, and configurations, either in part or whole, without any loss of generality.

The embodiments described herein are solely for the purpose of illustration. Those in the art will recognize other embodiments which may be practiced with modifications and alterations.

What is claimed is:

1. A method of generating time based data, the method comprising:
   defining a time based data generation scenario, the time based data generation scenario comprising:
      at least one event, the event representing an action at a specific time;
      a plurality of time segments, each time segment defining a particular temporal phase of the scenario and at least one time segment being embedded with the at least one event; and
      a time envelope to embed time segments, wherein the time envelope is a top-most outer time envelope that encompasses all time based entities for the scenario;
   specifying in at least one time based attribute rule a data attribute that is not time based, each of the at least one time based attribute rule linking the time envelope to the embedded time segments and the at least one event;
   generating at least a portion of a time based data object by executing the time based data generation scenario, the time based data object including data representing at least one of the plurality of time segments, and the embedded at least one event, and the specified at least one time based attribute rule;
   passing a memory buffer to the outer time envelope using a time based attribute rule, the outer time envelope providing the time based entities with access to the memory buffer;
   providing the generated time based data object to the memory buffer;
   interrupting the generating of the time based data object after determining the memory buffer is full;
   continuing the generating of the time based data object from where it was interrupted; and
   at least one of verifying and demonstrating functionality of a software application by providing the generated time based data object representing a data generation scenario for consumption by the software application.

2. The method of claim 1, wherein the action of the event is at least one of measurement data, alert data, and location data.

3. The method of claim 1, wherein each time segment is defined by a maximum time range that specifies a time period covered by the time segment and a time range length that specifies a calculated length of time for the particular temporal phase of the scenario.

4. The method of claim 1, wherein the time segments are indivisible.

5. The method of claim 1, wherein the time envelope comprises a plurality of other time envelopes.

6. The method of claim 1, wherein the generating of the time based data can be interrupted by halting a change in a state of the at least one event, the plurality of time segments, and the time envelope and resumed from where halted.

7. The method of claim 1, wherein the data generated by the executing of the time based data generation scenario is written to a first memory until the first memory is full, the data generating is interrupted, and the data in the first memory is persisted to a storage facility.

8. The method of claim 7, wherein the data generated by the executing of the time based data generation scenario is iteratively written to the first memory until the first memory is full, the data generating is interrupted, and the data in the first memory is persisted to a storage facility until a full extent of data generated for the scenario is persisted in the storage facility.

9. A non-transitory computer-readable medium having processor-executable instructions stored thereon, the medium comprising:
   instructions to define a time based data generation scenario, the time based data generation scenario comprising:
      at least one event, the event representing an action at a specific time;
      a plurality of time segments, each time segment defining a particular temporal phase of the scenario and at least one time segment being embedded with the at least one event; and
      a time envelope to embed time segments, wherein the time envelope is a top-most outer time envelope that encompasses all time based entities for the scenario;
   instructions to specify in at least one time based attribute rule a data attribute that is not time based, each of the at least one time based attribute rule linking the time envelope to the embedded time segments and the at least one event;
   instructions to generate at least a portion of a time based data object by executing the time based data generation scenario, the time based data object including data representing at least one of the plurality of time segments, and the embedded at least one event, and the specified at least one time based attribute rule;
   instructions to pass a memory buffer to the outer time envelope using a time based attribute rule, the outer time envelope providing the time based entities with access to the memory buffer;

instructions to provide the generated time based data object to the memory buffer;

instructions to interrupt the generating of the time based data object after determining the memory buffer is full;

instructions to continue the generating of the time based data object from where it was interrupted; and instructions to at least one of verify and demonstrate functionality of a software application by providing the generated time based data object representing a data generation scenario for consumption by the software application.

10. The medium of claim 9, wherein the action of the event is at least one of measurement data, alert data, and location data.

11. The medium of claim 9, wherein each time segment is defined by a maximum time range that specifies a time period covered by the time segment and a time range length that specifies a calculated length of time for the particular temporal phase of the scenario.

12. The medium of claim 9, wherein the time segments are indivisible.

13. The medium of claim 9, wherein the time envelope comprises a plurality of other time envelopes.

14. The medium of claim 9, further comprising instructions to interrupt the generating of the time based data by halting a change in a state of the at least one event, the plurality of time segments, and the time envelope and resumed from where halted.

15. The medium of claim 9, further comprising instructions to write the data generated by the executing of the time based data generation scenario to a first memory until the first memory is full, to interrupt the data generating, and to persist the data in the first memory to a storage facility.

16. The medium of claim 15, further comprising instructions to iteratively write the data generated by the executing of the time based data generation scenario to a first memory until the first memory is full, to interrupt the data generating, and to persist the data in the first memory to a storage facility until a full extent of data generated for the scenario is persisted in the storage facility.

* * * * *